Nov. 10, 1931.                H. J. BURNISH ET AL                1,830,782
                               COUPLING FOR PIPE LINES
                               Filed Oct. 29, 1927           2 Sheets-Sheet 1
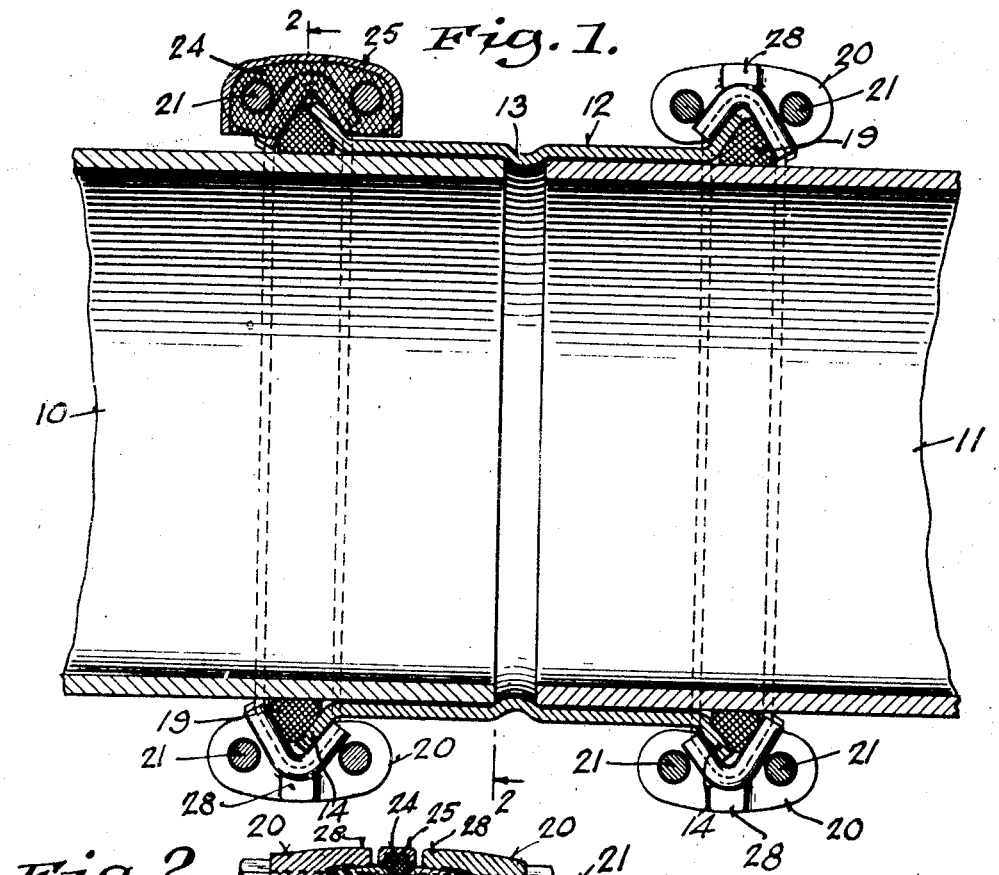
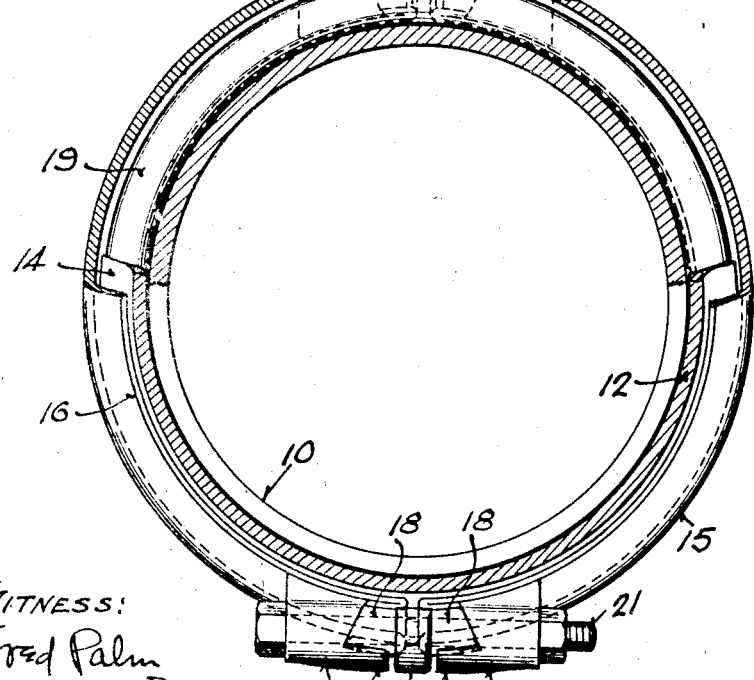
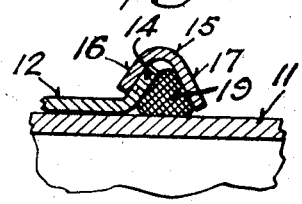
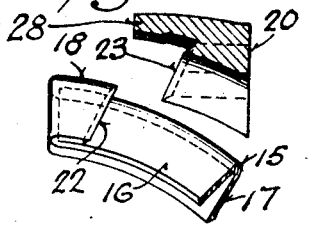
INVENTORS:
HOWARD J. BURNISH
AND CHARLES S. SMITH
ATTORNEYS.

Nov. 10, 1931.  H. J. BURNISH ET AL  1,830,782
COUPLING FOR PIPE LINES
Filed Oct. 29, 1927   2 Sheets-Sheet 2
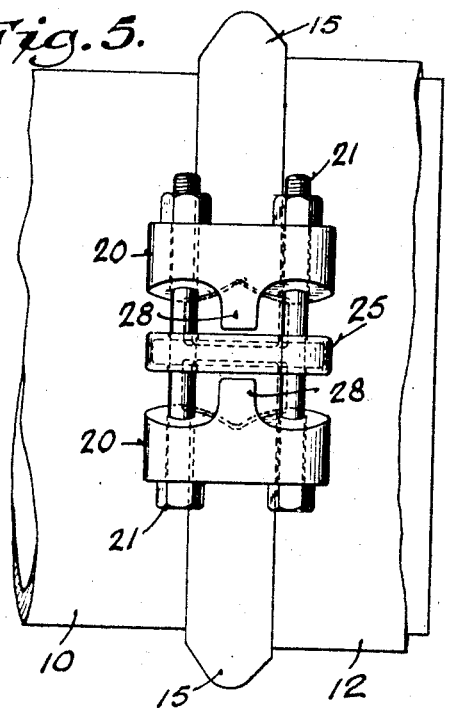
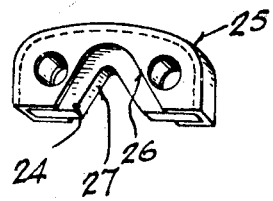
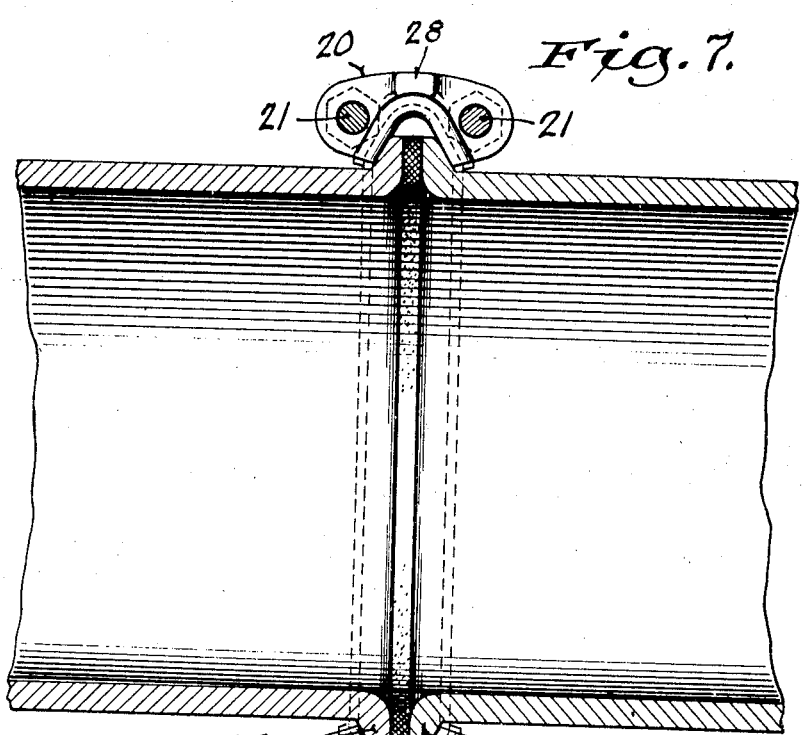
WITNESS:
INVENTORS:
HOWARD J. BURNISH
AND CHARLES S. SMITH
ATTORNEYS.

Patented Nov. 10, 1931

1,830,782

UNITED STATES PATENT OFFICE

HOWARD J. BURNISH AND CHARLES S. SMITH, OF MILWAUKEE, WISCONSIN, ASSIGNORS TO A. O. SMITH CORPORATION, OF MILWAUKEE, WISCONSIN, A CORPORATION OF NEW YORK

COUPLING FOR PIPE LINES

Application filed October 29, 1927. Serial No. 229,604.

The present invention relates to couplings intended primarily for use in connecting sections or lengths of plain end pipe, in pipe line installations, so as to make a tight but expansible joint. But the coupling member is capable of use in connection with certain types of flanged pipe. The invention resides in part in a divided annular clamping member of simple form, which may be produced as a stamping from sheet metal, whereby its manufacture will be greatly expedited and reduced in cost. Two of such clamping members are used at each joint, in conjunction with a middle ring or sleeve, into the opposite ends of which the ends of the pipe sections to be coupled are adapted to be entered. The ends of such middle ring or sleeve are flared outwardly, to provide a space opening in the direction of the length of the pipe, for the accommodation of a packing ring or gasket which encircles the pipe and is subjected to compression against the pipe to fill the flare, when the clamping member is applied.

The clamping member is in the form of a divided ring or band, preferably formed from heavy sheet metal, and approximately V-shaped in cross section, or otherwise grooved interiorly for the reception and partial enclosure of the packing ring. One diverging branch of the V-shaped or otherwise grooved ring is adapted to engage the outer side of the flared end of the sleeve, and the other branch of the grooved ring is adapted to engage the packing ring, so that when the ends of the clamping member are brought together, the packing ring is compressed and confined in the triangular space extending circumferentially about the pipe, and defined by the pipe, the inside flare at the end of the sleeve, and the said other branch of the grooved ring, and compressed about the circumference of the pipe section to make a tight joint, one on each side of the abutting or meeting line of the ends of the pipe sections, but removed outwardly a short distance from such line.

Each of the ends of the grooved sheet metal clamping member is returned and over-lapped upon its exterior, so as to form an outwardly extending projection or radial abutment which is engaged by a co-operating notched locking member, two of such locking members arranged opposite each other being brought together by means of bolts or screws, to complete the coupling structure.

The projection or abutment formed on the clamping member tapers forwardly from the middle line of the member toward the edges thereof and is undercut, and the notch of the locking member is tapered and undercut to correspond, so as to insure a proper positioning and interlocking engagement of the parts when the clamping is effected.

In the gap at the meeting line of the slightly separated ends of the clamping members, we insert a compressible filler which is adapted to resist the outward flow of the packing ring into the said gap, and so prevent the possibility of a leak developing at that point. A metal casing for the filler supported on the clamping bolts or screws is provided, to confine the filler against contrary expansion.

The clamp is also applicable, without modification of its structure, to the ends of flared and flanged pipes of certain types, it acting to draw such ends toward each other to clamp a packing ring between them, and thus effect a tight joint.

The structural features of the invention in the form ilustrated in the accompanying drawings, will now be described in detail, and the novelty thereof pointed out in the appended claims.

In the accompanying drawings:

Figure 1 is a longitudinal central section through the meeting ends of two plain pipe sections, showing the manner in which our invention is applied thereto, to produce a tight joint in a pipe line, and showing the arrangement of a filler in the gap between the ends of the clamping members.

Fig. 2 is a transverse section upon the irregular line 2—2, Fig. 1, and partly in end elevation, illustrating the application and operation of the invention.

Fig. 3 is a longitudinal section through a portion of one wall of the pipe and the sleeve, showing the action of the clamping member upon the packing ring, both of the latter being shown in transverse section.

Fig. 4 is a fragmentary view showing in side elevation the formation of one end of the interiorly grooved clamping member, and also of the locking member co-acting therewith, the latter being in longitudinal section.

Fig. 5 is a plan view of the outer end of one pipe and a section of the sleeve or middle ring thereon, and an assembled clamping member in the position of use.

Fig. 6 is a perspective view of the metal casing for enclosing the filler which is inserted in the gap between the meeting ends of the clamping member.

Fig. 7 is a longitudinal central section through the meeting ends of two lengths of flanged pipe, showing the application of our improved clamp thereto, and the manner in which the coupling of flanged or flared pipes is effected.

In the drawings, the numerals 10 and 11 indicate the ends of two sections or lengths of plain pipe, and the numeral 12 is a middle ring or sleeve in which the ends of the pipe are entered. Preferably, the sleeve is provided with a circumferential constriction 13, formed in the region of the middle of its length, such constriction acting as a spacing means or stop to determine the extent of the entry of the ends of the pipe into the sleeve. The ends of the sleeve are flared outwardly as shown at 14, for a purpose which will be described. The interior diameter of the sleeve 12 is such that the ends of the sections of pipe 10 and 11, when entered therein, will fit closely.

Preferably, from a strip of sheet metal of suitable gauge, we form a sectional clamping member or band 15 of inverted V-shape in cross section, so as to provide such band with an outer ridge or back-bone and legs or branches 16 and 17, diverging inwardly from the said ridge. The ends of the band section are returned and made to over-lap as at 18, to form radially extending projections on the bands, and such returned ends may be spot welded or otherwise secured to the band so as to fix them rigidly in position against accidental disturbance, by the pull thereon. The returned projections 18 are undercut or shouldered at their ends, as shown. The annular clamping member or band 15, may be formed as a split ring, or as a plurality of parts.

A packing ring 19, preferably of circular cross section, is placed about the pipe, before the same is positioned in the sleeve 12, and then made to enter the annular space provided by the flare in the end of the sleeve and the side of the pipe. The V-shaped clamping members are then positioned as a saddle, with the leg 16 bearing upon the outer side of the flared end of the sleeve, and the leg 17 upon the exposed portion of the packing ring, in the manner shown in Figs. 1 and 3. When pressure is applied to the clamping member or band 15, the cross-sectional contour of the packing ring is deformed from its circular shape into approximately the triangular shape illustrated, and tightly wedged into the annular space between the pipe and the flared end of the sleeve, so as to effect a closed but expansible joint at each end of the sleeve.

The numeral 20, Fig. 4, indicates one of the longitudinally grooved, undercut or shouldered locking members, which latter may be a forging, co-operating with the undercut or shouldered return or projection 18 at each end of the clamping member 15. The longitudinal groove in the locking member 20 is conformed to the exterior surface of the clamping member 15 and the projection 18, at the end of the member 15, so as to embrace the ridge or back-bone of the clamping member. The undercut surface 22 at the rear end of the projection 18 tapers forwardly to the sides of the clamping member, and the undercut surface 23 of the locking member 20 tapers to correspond, so that when assembled, the parts are properly positioned. The locking members 20 are separate from the clamping members and are bored longitudinally for the reception of bolts or screws 21, which latter, when passed through the aligned bores of two of such members and tightened, following the engagement of the beveled and undercut surface 23 on the locking member 20 with the complemental surface 22 of the projection 18 on the clamping member 15, serve to draw the clamping members 15 toward each other, and thus deform the packing ring 19 by pressure upon the sides thereof, as before described. Preferably, two bolts or screws 21 are employed in each connection, as shown in Fig. 1. With the draft of the bolts 21, the annular coupling member 15 decreases in diameter, it sliding down the inclined outer surface of the flared end of the sleeve 12, and compressing the packing ring within the triangular opening produced by the assembly of the parts. The forward extensions 28 on the locking members 20, slide over the projections 18 on the clamping members 15, and assist in maintaining the alignment of the parts.

In the arrangement thus far described, there will exist a gap between the adjacent ends of the clamping members 15, into which gap the internal pressure in the pipe might cause the portion of the packing ring 19 underlying the gap, to enter, and cause a leak. We avoid the liability of such leak, by inserting in the said gap a compressible filler 24, of suitable packing material, enclosed in a metal casing 25. The casing 25 and the filler 24 are provided with aligned bores, through which are passed the bolts 21, at the time of assembly of the parts. The sides of the casing 25 are cut away, as at 26, to permit entry of the ends of the clamping members 15, when the bolts 21 are tightened. The filler 24 is notched, as at 27, to straddle the packing ring 19. The filler is confined against movement except toward the packing ring, and when pressure is applied by drawing on the bolts 21, the lower edge of the filler 24 will be caused to bear down on the packing ring, and spread out into the form shown in Fig. 2, and so prevent the development of a leak at that point.

In the foregoing, we have described our invention as applicable to coupling the ends of plain pipe sections together, but the invention is also applicable, without modification, to use in coupling the ends of flanged pipe sections, as shown in Fig. 7, in which the sections of pipe 30 and 31, flared or flanged as at 32 and 33, are brought together with a gasket 34 interposed between their ends. In such use, the clamping members 15 encircle the flanges of the pipe and compress the gasket between them, when drawn up by the bolts or screws 21 and locking members 20.

The construction is simple and economical and very effective in its operation. It is easily applied; it likewise is easily removable without injury to the parts, in case disconnection of the sections of the pipe becomes necessary.

While we have shown and described the coupling member 15, as of V-shape in cross section, our invention is not to be restricted to that construction, inasmuch as the interior groove in the member 15, may be of any cross section which will permit the placement and retention therein of the packing ring 19, and otherwise function in accordance with the purposes of our invention.

Having thus described our invention, what we claim and desire to secure by Letters Patent of the United States, is:

1. A pipe coupling for plain-end pipe, comprising a sleeve having outward flares at its ends into which the ends of the pipes to be coupled may be inserted, and packing rings adapted to surround the pipes and be disposed one in the flare at each end of the sleeve, in combination with divided annular clamping members grooved in cross section for encircling the pipes and the ends of the sleeve, such clamping members being provided at their meeting ends with projections undercut at their rear sides, locking members provided with undercut portions engageable with the said undercut projections, and means operating on the locking members for drawing the clamping members into engagement with the outer side of the flared ends of the sleeve and the packing rings, to compress the latter into the spaces between the flared ends of the sleeve and the pipe.

2. A pipe coupling for plain-end pipe, comprising a sleeve with outward flares at its ends into which the ends of the pipes to be coupled may be inserted, and packing rings adapted to surround the pipes and be disposed one in the flare at each end of the sleeve, in combination with divided annular clamping members of V-shape in cross section for encircling the pipes and the ends of the sleeve, such clamping members being provided at their meeting ends with projections, locking members grooved longitudinally to receive the clamping member and provided with notches to engage the said projections, and means operating on the locking members for drawing the clamping members into engagement with the outer side of the flared ends of the sleeve and the packing rings, to compress the latter into the spaces between the flared ends of the sleeve and the pipe.

3. In a pipe coupling, a clamping member in the form of a transversely divided sheet metal annulus of V-shaped cross section having portions at its meeting ends returned and over-lapped to constitute projections, in combination with locking members grooved longitudinally to receive the clamping members, and means on the locking members to engage the said projections to draw the clamping member into effective relation with the pipe.

4. In a pipe coupling, a clamping member in the form of a transversely divided ring of V-shape in cross section and provided at its meeting ends with radial projections, in combination with separate locking members for engaging the said projections, both the radial projections and the locking members having opposed interlocking undercut faces which diverge from the center line of the clamp member to align the parts, and means operating on the locking members to draw the ends of the clamping member together.

5. In a pipe coupling for plain-end pipe, a sleeve having an outward flare at its end into which the end of a pipe may be inserted, and a packing ring adapted to surround the pipe and be seated in the flare of the sleeve, a transversely divided annular clamping member encircling the pipe and the end of the sleeve, means for drawing the clamping member into engagement with the outside of the flared end of the sleeve and the packing ring, to compress the latter into the space between the flared end of the sleeve and the pipe, and means to prevent movement of the packing ring into the space at the ends of the divided clamping member, such means comprising a filler and a casing therefor supported by the drawing means.

6. In a pipe coupling, a transversely divided annular clamping member grooved interiorly for the reception of a packing ring, the said clamping member being provided with outward projections at its meeting ends, bolts for effecting clamping action of the member through the said projections, and a filler supported by the said bolts in the space between the ends of the clamping member, to prevent outward movement of the packing ring into such space.

7. In a pipe coupling, a transversely divided annular clamping member grooved interiorly for the reception of a packing ring, the said clamping member being provided with outward projections at its meeting ends, bolts for effecting clamping action of the member through the said projections, and a casing and a filler therein supported by the said bolts in the space between the ends of the clamping member, to prevent outward movement of the packing ring into such space.

8. In a pipe coupling, a transversely divided clamping member grooved interiorly for the reception of a packing ring, the said clamping member being provided with outward projections at its meeting ends, separate locking members engaging the said projections, means for connecting the said locking members and effecting clamping action of the member, and a filler supported by the said connecting means in the space between the ends of the clamping member, to prevent outward movement of the packing ring into such space.

9. In a pipe coupling, a transversely divided clamping member grooved interiorly for the reception of a packing ring, the said clamping member being provided with rearwardly extending inclined shoulders at its meeting ends, separate locking members engaging the said shoulders, bolts for connecting the said locking members and effecting clamping action of the member, and a casing and a filler therein supported by the said bolts in the space between the ends of the clamping member, to prevent outward movement of the packing ring into such space.

10. A pipe coupling comprising a sleeve having outwardly flared end portions into which the ends of the pipes to be coupled are adapted to be inserted, packing rings surrounding the pipes and disposed between the flared portions of the sleeve and the pipe, segmental annular clamping members having V-shaped cross sections for encircling the pipes and the flared portions of the sleeve, inclined shoulders at each end of the individual segments of the clamping members, clamping blocks having complementary inclined surfaces adapted to engage the inclined shoulders of the individual segments, and adjustable means connecting adjacent clamping blocks for bringing the clamping members into engagement with the outer side of the flared ends of the sleeve and the packing rings to compress the latter into the spaces between the flared ends of the sleeve and the pipe.

In testimony whereof, we have signed our names at Milwaukee, Wisconsin, this 26th day of October, 1927.

HOWARD J. BURNISH.
C. S. SMITH.